United States Patent Office 3,268,555
Patented August 23, 1966

3,268,555
PROCESSES WHICH COMPRISE REACTING PROLINE OR PYRROLIDINE WITH AN OXO GROUP CONTAINING COMPOUND AND PRODUCTS THEREOF
Lazare Wiseblatt, Chicago, Ill., assignor to Research Corporation, New York, N.Y., a corporation of New York
No Drawing. Filed Oct. 10, 1962, Ser. No. 229,748
6 Claims. (Cl. 260—326.3)

This invention relates to novel flavoring compositions for use in foodstuffs and the like and to methods of making them.

I have found that a group of new and useful flavoring compositions may be made by reacting aliphatic ketols with amino acids or with certain decarboxylation products thereof such as pyrrolidine.

As one component of the reaction mixture any of the naturally occurring α-amino acids may be used, either in the racemic or in one of the optically active forms. Among the aliphatic ketols which may be used to produce useful compositions by the method of the invention are 1,3-dihydroxyacetone, 1-hydroxy-2-propanone, glyceraldehyde and their lower alkyl homologs and lower alkanoic esters such as acetylmethylcarbinol and the acetic acid ester of 1-hydroxy-2-propanone, respectively.

In general, the character of the flavoring composition obtained is affected more by the amino acid used than by the ketol. Most of the different amino acids produce compositions of typically different character and strength but most of the compositions have a pleasing aroma except those obtained from sulfur containing acids such as cysteine. Pyrrolidine gives a flavoring composition having a distinct cracker-like aroma like that obtained with its carboxylic acid derivative proline.

The reaction may be carried out in aqueous solution or in water-miscible or water-immiscible solvents such as ethyl alcohol, pyridine and toluene. Preferably the reaction is carried out in aqueous solution at a pH in the range from about 4 to about 8.5.

The following examples are illustrative of the principles of the invention:

CRACKER FLAVOR

(A) From proline

An aqueous solution containing approximately equimolar amounts of L-proline and 1,3-dihydroxyacetone develops a brown color and distinctly crackerlike aroma on boiling for a few minutes. Prolonged boiling achieves only a moderate intensification of the aroma, while the solution becomes extremely dark. The aroma intensity achieved shows relatively little pH dependence within the pH range 4.0–8.5. Under more acidic conditions, the aroma synthesis and browning are both drastically inhibited, while under more basic conditions there arise objectionable odors, and browning becomes severe. Phosphate ions and potassium bromate both exhibit catalytic properties towards aroma production; the former, however, also catalyzes browning, while the latter must be limited to low concentrations if the reaction mixture is to be incorporated in bread doughs.

Proline and 1,3-dihydroxyacetone react very satisfactory in non-aqueous media to yield the cracker aroma. Ethyl alcohol, pyridine, and toluene are satisfactory solvents. In every instance, decarboxylation of the proline is evidenced by the vigorous evolution of carbon dioxide and a progressive development of basicity in the reaction mixture. When toluene is used, there is azeotropic distillation of water with the solvent, suggesting the splitting-out of water in a condensation reaction.

(B) From pyrrolidine

One-half mole (35.6 grams) of ice-cold pyrrolidine is added dropwise to ½ mole (30 grams) of glacial acetic acid, with cooling in an ice bath. When all the pyrrolidine has been added, the resulting golden-yellow syrup is warmed gently on a water-bath, and ½ mole (45 grams) of 1,3-dihydroxyacetone is added in small portions. The condensation reaction is exothermic, and warming must be limited to prevent violent frothing.

After all the 1,3-dihydroxyacetone has gone into solution, the reaction mixture is an opaque, viscous darkbrown liquid. This is distilled at atmospheric pressure; distillate begins to come over at 102° C., and when the vapor temperature attains 110° C., there is a temporary cessation of distillation. The distallate boiling between 102°–110° C., about 20 ml. in volume, contains most of the desired aroma compound, together with acetic acid and water. To isolate the aroma compound, the distillate is neutralized with sodium bicarbonate, saturated with salt, and the product extracted into choroform. The extract is dried over anhydrous sodium sulfate and evaporated under vacuum to remove the solvent. The yield is about 3 grams.

The following table lists the aromas of the flavoring compositions produced by boiling aqueous mixtures of 1,3-dihydroxyacetone with other amino acids:

| Amino acid: | Description of aroma |
|---|---|
| Lysine | Strong, like dark corn syrup. |
| Valine | Strong, yeasty, protein hydrolysate. |
| Alanine | Weak, caramel. |
| Glutamic acid | Moderate, chicken broth. |
| Aspartic acid | Very weak. |
| Arginine | Very weak. |
| Hydroxyproline | Weak, vaguely like proline. |
| Phenylalanine | Very strong, hyacinth. |
| Leucine | Strong, cheesy, baked potato. |
| Isoleucine | Moderate, crust. |
| Serine | Weak, vaguely bread-like. |
| Threonine | Very weak. |
| Methionine | Baked potato. |
| Glycine | Baked potato. |
| Histidine | Very weak. |
| Tryptophan | Strong, indole. |
| Tyrosine | Very weak. |

Modified flavors may be made by using various mixtures of amino acids in suitable proportions.

The method of the invention may be utilized either by adding the appropriate reactants to the food batch prior to baking or cooking, so that the baking or cooking provides the heat required for flavor generation, or by preforming the flavoring compositions in a suitable liquid reaction medium which may be blended into the food batch either as such or after concentration of the flavor substances.

For example, when an aqueous solution of proline and 1,3-dihydroxyacetone was boiled for 15 minutes and added to a chemically-leavened instant bread mix developed by the Quartermaster Food and Container Institute for the Armed Forces at a level equivalent to 0.0375% proline and 0.03% 1,3-dihydroxyacetone (based on flour weight), the bread with this addition was ranked best in flavor of any of the levels tested and far superior to the control. The flavor improvement was even more notable when toast was made from these breads.

A further improvement resulted when the proline-1,3-dihydroxyacetone pre-boiled mixture was added together with 0.005% each of isoleucine, valine and alanine, and 0.0013% of 1,3-dihydroxyacetone; the fresh bread had an aroma which seemed deficient only in the alcoholic character of normally flavorful yeast-leavened bread. Thus a formulation based on 100 pounds of flour would be prepared as follows:

17 grams of L-proline
13.6 grams of 1,3-dihydroxyacetone
500 ml. of water
Boil together for 15–20 minutes To the cooled solution add 2.25 grams each of alanine, valine and isoleucine, and 5.9 grams 1,3-dihydroxyacetone. Adjust the volume, if necessary, to 500 ml., or to one pint (whichever is most convenient). This mixture replaces an equal volume of water in the dough.

I claim:

1. A method of making breadstuff flavoring compositions which consists of heating, at a pH between 4.0–8.5, proline with 1,3-dihydroxyacetone, glyceraldehyde, acetylmethylcarbinol, 1-hydroxy-2-propanone or 1-hydroxy-2-propanone acetate.

2. A method of making breadstuff flavoring compositions which comprises heating, at a pH between 4.0–8.5, pyrrolidine with 1,3-dihydroxyacetone, glyceraldehyde, acetylmethylcarbinol, 1-hydroxy-2-propanone or 1-hydroxy-2-propanone acetate.

3. A method of making a breadstuff flavoring composition which consists of heating, at a pH between 4.0–8.5, proline and 1,3-dihydroxyacetone.

4. A method of making a breadstuff flavoring composition which comprises heating, at a pH between 4.0–8.5, pyrrolidine and 1,3-dihydroxyacetone.

5. The breadstuff flavoring composition obtained by the process of claim 1.

6. The breadstuff flavoring composition obtained by the process of claim 2.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,103,495 | 12/1937 | Ruckdeschel | 99—27 |
| 2,836,602 | 5/1958 | Rosch et al. | 260—313 |
| 2,934,436 | 4/1960 | May et al. | 99—140 |
| 2,964,535 | 12/1960 | Clements | 260—326.5 |
| 3,060,031 | 10/1962 | Moriarity et al. | 99—90 |

FOREIGN PATENTS 858,660   1/1961   Great Britain.

HENRY R. JILES, *Acting Primary Examiner.*
BEATRICE H. STRIZAK, *Examiner.*
A. LOUIS MONACELL, JOSE TOVAR, J. M. GOLIAN,
*Assistant Examiners.*